United States Patent
Lee et al.

(10) Patent No.: US 7,218,451 B2
(45) Date of Patent: May 15, 2007

(54) INTEGRATED OPTICAL MULTIPLEXER AND DEMULTIPLEXER

(75) Inventors: Jerry Lee, Saragota, CA (US); Yang Sheng, San Jose, CA (US); Qunwen Leng, San Jose, CA (US); Yiqiang Li, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 178 days.

(21) Appl. No.: 11/051,512

(22) Filed: Feb. 4, 2005
(Under 37 CFR 1.47)

(65) Prior Publication Data

US 2006/0018204 A1    Jan. 26, 2006

Related U.S. Application Data

(60) Provisional application No. 60/542,323, filed on Feb. 5, 2004.

(51) Int. Cl.
*G02B 27/10* (2006.01)
*G02B 27/14* (2006.01)
*G02B 27/28* (2006.01)
*G02F 1/03* (2006.01)
*H04J 14/00* (2006.01)

(52) U.S. Cl. ............ 359/618; 359/629; 359/634; 359/246; 359/495; 359/497; 398/49

(58) Field of Classification Search ......... 359/618, 359/629, 634, 722, 589, 245, 246, 484, 494–498, 359/487; 398/27, 41, 49, 62, 65, 79, 85, 398/87, 135, 139, 158, 185, 93; 385/15, 385/16, 20, 24, 31, 33, 35, 47; 369/44.38, 369/112.17, 106
See application file for complete search history.

(56) References Cited

U.S. PATENT DOCUMENTS

| | | | |
|---|---|---|---|
| 4,685,773 A | 8/1987 | Carlsen et al. ............. 359/495 |
| 4,868,820 A * | 9/1989 | Nagashima et al. ..... 369/44.38 |
| 4,905,214 A * | 2/1990 | Nagashima .............. 369/44.38 |
| 4,909,584 A | 3/1990 | Imoto et al. .................. 385/24 |
| 4,914,719 A | 4/1990 | Conlon et al. ......... 250/339.13 |
| 5,384,651 A * | 1/1995 | Van de Voorde et al. ... 398/185 |
| 5,867,291 A * | 2/1999 | Wu et al. .................... 398/49 |
| 6,130,971 A | 10/2000 | Cao ............................ 385/31 |
| 6,373,604 B1 | 4/2002 | Xie .............................. 398/79 |
| 6,493,121 B1 * | 12/2002 | Althaus ...................... 398/135 |
| 6,512,615 B2 | 1/2003 | Wu et al. .................... 398/87 |
| 6,515,956 B2 * | 2/2003 | Tamada ................. 369/112.17 |
| 6,563,641 B2 | 5/2003 | Zhao .......................... 359/495 |
| 6,570,711 B2 | 5/2003 | Ducellier .................... 359/629 |
| 6,614,573 B1 | 9/2003 | Cao ............................ 359/246 |
| 6,643,063 B2 | 11/2003 | Gu ............................. 359/494 |
| 6,661,953 B2 | 12/2003 | Cao ............................ 385/37 |
| 2003/0175030 A1 | 9/2003 | Chen et al. ................... 398/85 |

* cited by examiner

*Primary Examiner*—Loha Ben
(74) *Attorney, Agent, or Firm*—Fish & Richardson P.C.

(57) ABSTRACT

Optical multiplexers and demultiplexers are provided. In one implementation an apparatus is provided. The apparatus includes a first laser diode pair, a second laser diode pair, a polarization rotator coupled between the first and the second laser diode pairs, and an output port. The first and second laser diode pairs include a first laser diode, a polarization beam splitter, a first quarter waveplate, a filter; a second quarter waveplate, and a second laser diode. The first and second laser diode pairs are coupled to the polarization rotator at the polarization beam splitter of each laser diode pair. In one implementation the apparatus is operable to multiplex distinct light signals emitted from the first and second laser diodes. In another implementation, an apparatus is provided that is operable to demultiplex an input light beam having a plurality of distinct channels.

5 Claims, 10 Drawing Sheets

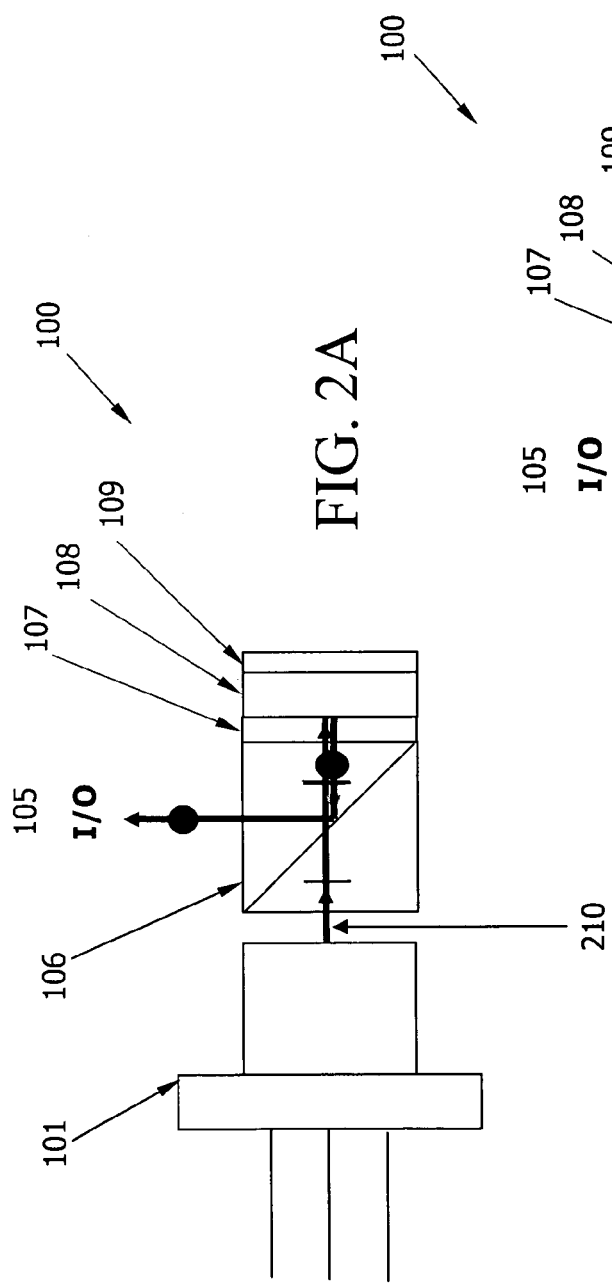
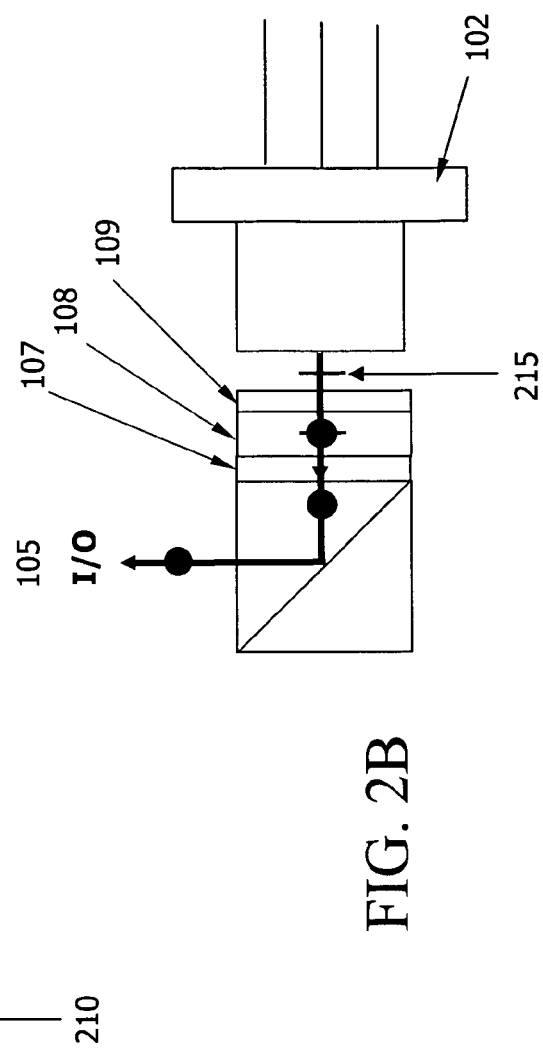
FIG. 2A
FIG. 2B

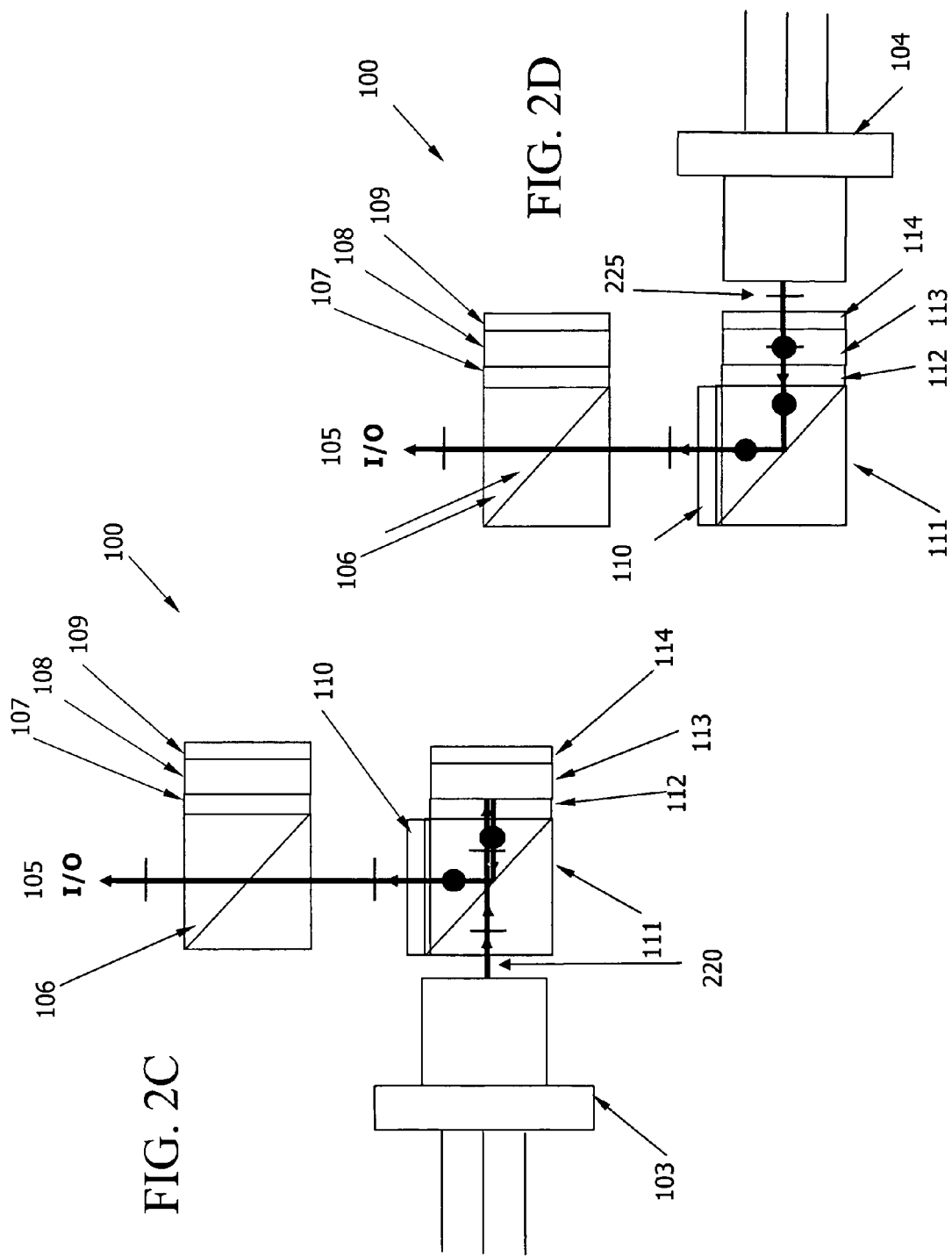

INTEGRATED OPTICAL MULTIPLEXER AND DEMULTIPLEXER

CROSS-REFERENCE TO RELATED APPLICATIONS

This application claims priority to U.S. Provisional Application Ser. No. 60/542,323, filed on Feb. 5, 2004.

BACKGROUND

The present invention relates to optical multiplexers and demultiplexers. An optical multiplexer can be used to combine multiple optical signals to be transmitted at substantially the same time, for example, through a single fiber or waveguide. For example, one type of multiplexer is a wavelength division multiplexer, which combines a number of optical signals, each having different wavelengths, into a single multiplexed signal. An optical demultiplexer, in contrast, can be used to separate a multiplexed signal into a number of individual optical signals, for example, optical signals having different wavelengths.

Conventional packages can be used for a multiplexer or demultiplexer device. For example, a TO-18 package can be used in conjunction with a multiplexer, and a TO-46 package for the demultiplexer. Typically, the laser diodes in the multiplexer, or the photo-detectors in the demultiplexer, take up significant amounts of space in the packages. Consequently, some or all of the other optical components required to multiplex or demultiplex signals may be positioned outside of the packages.

SUMMARY

Optical multiplexers and demultiplexers are provided. In general, in one aspect, the specification provides an apparatus. The apparatus includes a first laser diode pair, a second laser diode pair, a polarization rotator coupled between the first and the second laser diode pairs, and an output port. The first and second laser diode pairs include a first laser diode, a polarization beam splitter, a first quarter waveplate, a filter; a second quarter waveplate, and a second laser diode. The first and second laser diode pairs are coupled to the polarization rotator at the polarization beam splitter of each laser diode pair.

Advantageous implementations can include one or more of the following features. The apparatus can be operable to multiplex distinct light signals emitted from the first and second laser diodes. The first and second laser diode pairs can further include a lens coupled to each laser diode operable to collimate light. The first and second laser diodes can further include one or more electronic pins for receiving input signals. The apparatus can be contained within a single package.

In general, in one aspect, the specification provides an apparatus. The apparatus includes a first input block that includes a laser diode, a polarization beam splitter, a quarter waveplate, a filter, and a three-quarter waveplate. The apparatus also includes a final input block coupled in series with the polarization beam splitter of the first input block, and an output port.

Advantageous implementations can include one or more of the following features. The final input block can include a laser diode and a reflector. The apparatus can further include a second input block coupled in series between the polarization beam splitter of the first input block and the reflector of the final input block. The second input block can include a second laser diode, a second polarization beam splitter, a second quarter waveplate, a second filter, and a second three-quarter waveplate. The apparatus can further include a third input block coupled in series between the second polarization beam splitter of the second input block and the reflector of the final input block. The third input block can include a third laser diode, a third polarization beam splitter, a third quarter waveplate, a third filter, and a third three-quarter waveplate. The apparatus can further include one or more additional input blocks coupled in series between the third input block and the final input block. The apparatus can be operable to multiplex distinct light signals emitted from a plurality of laser diodes and the apparatus can be contained within a single package.

In general, in one aspect, the specification provides an apparatus. The apparatus includes an input block, a first photo-detector pair, and a second photo-detector pair coupled to the first photo-detector pair. The first and second photo-detector pairs include a first photo-detector, a first filter, a first quarter waveplate, a polarization beam splitter, a second quarter waveplate, a second filter, and a second photo-detector. The first and second photo-detector pairs are coupled through the polarization beam splitter of each photo-detector pair.

Advantageous implementations can include one or more of the following features. The apparatus can be operable to demultiplex an input light beam having a plurality of distinct channels. The input block can include an input port, a polarization beam displacer, and a polarization rotator. The apparatus can further include a focusing lens coupled to each photo-detector. The apparatus can further include one or more additional photo-detector pairs optically coupled in series to the first and the second photo-detector pairs at a polarization beam splitter of each additional photo-detector pair. The apparatus can be contained within a single package.

In general, in one aspect, the specification provides an apparatus. The apparatus includes an input block, a first photo-detector block, and a final photo-detector block. The first photo-detector block includes a photo-detector, a filter, a first quarter waveplate, a polarization beam splitter, a second quarter waveplate, and a mirror. The final photo-detector block is optically coupled in series with the polarization beam splitter of the first photo-detector block.

Advantageous implementations can include one or more of the following features. The apparatus can be operable to demultiplex an input light beam having a plurality of distinct channels. The final photo-detector block can include a reflector, a filter, and a photo-detector. The reflector can be a right angle prism. The apparatus can further include a second photo-detector block coupled in series between the first photo-detector block and the final photo-detector block. The second photo-detector block can include a photo-detector, a filter, a first quarter waveplate, a polarization beam splitter, a second quarter waveplate, and a mirror. The polarization beam splitter of the second photo-detector block can be optically coupled to the polarization beam splitter of the first photo-detector block. The apparatus can further include a third photo-detector block coupled in series between the second photo-detector block and the final photo-detector block. The third photo-detector block can include a photo-detector, a filter, a first quarter waveplate, a polarization beam splitter, a second quarter waveplate, and a mirror. The polarization beam splitter of the third photo-detector block can be optically coupled in series between the polarization beam splitter of the second photo-detector block and the reflector of the final photo-detector block. The input block can include an input port, a polarization beam displacer, and a polarization rotator. The apparatus can be contained within a single package.

The invention can be implemented to realize one or more of the following advantages. A multiplexer is provided that can integrate a number of laser diodes and other optical components of the multiplexer within a single package. Similarly, a demultiplexer is provided that can integrate a number of photo-detectors and other optical components of the demultiplexer within a single package. The multiplexer or demultiplexer can be compact in size and have a low insertion loss. With a compact size, alignment can be accomplished more easily and the multiplexer or demultiplexer package can be fit into other application packages, such as Xenpak or X2 packages. In addition, the input or output electric pins of the multiplexer or demultiplexer can be positioned in the same plane, which increases the ease with which the multiplexer or demultiplexer can be attached to a printed circuit board. A multiplexer or demultiplexer can also provide the input or output electrical pins on a same side of the multiplexer or demultiplexer package.

A multiplexer can have a compact size based on standard TO-18 laser diode package. The compact size can minimize the distance between the laser diodes and the output port. Additionally, the output of a multiplexer or demultiplexer can be positioned such that the multiplexer can be easily mounted onto a customer's system. Similarly, a demultiplexer can also have a compact size based on a standard TO-46 photo-detector package. The compact size can minimize the distance between the photo-detectors and the input port, allowing improved alignment.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 2A–2D illustrate the paths of light beams through the integrated optical multiplexer of FIG. 1.

Like reference numbers and designations in the various drawings indicate like elements.

DETAILED DESCRIPTION

Figure 1:
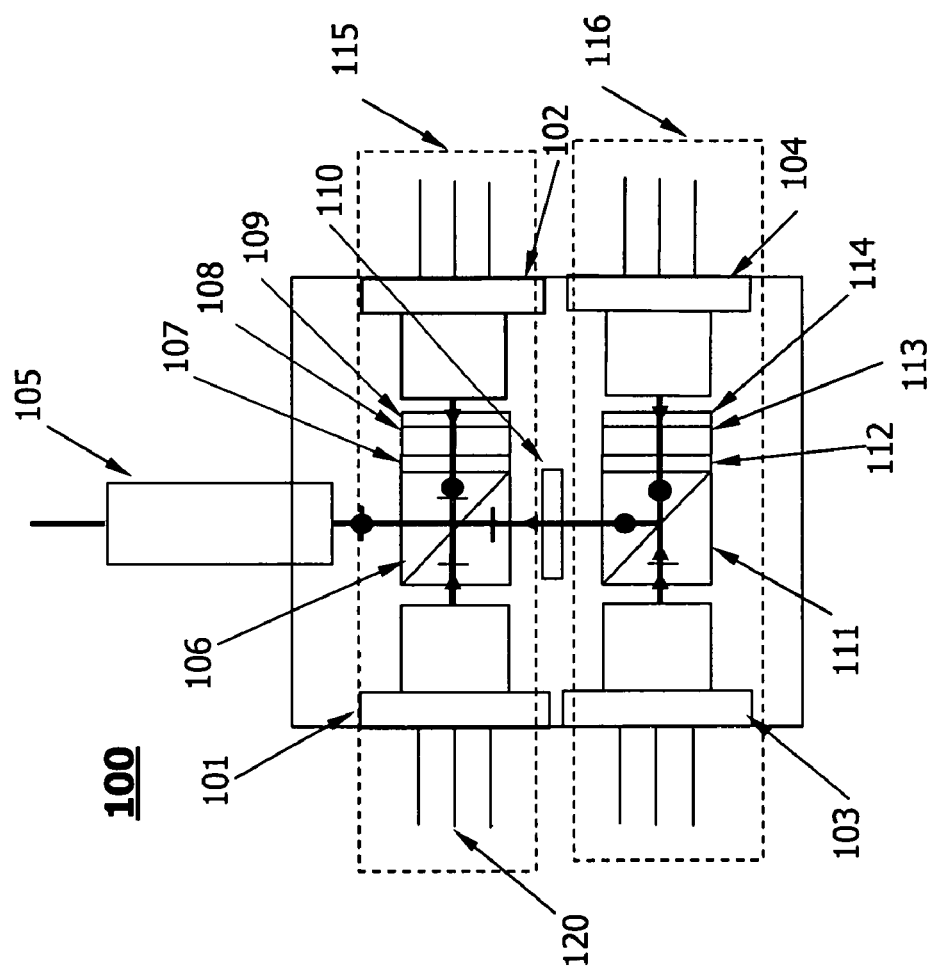
FIG. 1 illustrates an integrated optical multiplexer within a single package.

An integrated optical multiplexer or demultiplexer within a single package is provided. FIG. 1 illustrates one implementation of an integrated optical multiplexer. In one implementation, the multiplexer 100 is a four channel multiplexer that includes four laser diodes 101, 102, 103, and 104 as well as an output port 105. In one implementation, the laser diode package can be a standard TO-18 package. In another implementation, each laser diode 101–104 includes one or more electrical pins (e.g., electrical pin 120) for receiving an electrical input signal. In one implementation, the electrical pins of each laser diode 301–304 are in the same plane. In one implementation, the dimensions of the multiplexer package including the laser diodes is substantially 15 mm×16 mm. The multiplexer 100 also includes a first laser diode pair 115, a second laser diode pair 116, and a polarization rotator 110. The polarization rotator 110 is positioned between the first and second laser diode pairs 115 and 116. The first laser diode pair 115 includes laser diodes 101 and 102, a polarization beam splitter 106, a first quarter waveplate 107, a filter 108, and a second quarter waveplate 109. The second laser diode pair 116 includes laser diode 103, a polarization beam splitter 111, a first quarter waveplate 112, a filter 113, a second quarter waveplate 114, and laser diode 104.

The polarization beam splitter 106 is optically coupled to the laser diode 101, the first quarter waveplate 107, the output port 105, and the second laser diode pair 116, via the polarization rotator 110. The filter 108 is optically coupled between the first and second quarter waveplates 107 and 109. The second quarter waveplate 109 is also optically coupled to the laser diode 102. In an alternative implementation, the placement of the polarization beam splitter 106, first quarter waveplate 107, filter 108, and second quarter waveplate 109 can be reversed.

The polarization beam splitter 111 is optically coupled to the laser diode 103, the first quarter waveplate 112, and the polarization rotator 110. The polarization rotator 110 is operable to rotate a polarization of light by 90 degrees. In one implementation, the polarization rotator 110 is a half waveplate. The polarization rotator 110 is optically coupled to the polarization beam splitter 106 of the first laser diode pair 115 and the polarization beam splitter 111 of the second laser diode pair 116. The filter 113 is optically coupled between the first and second quarter waveplates 112 and 114. The second quarter waveplate 114 is also optically coupled to the laser diode 104. As with the first laser diode pair 115, the placement of the polarization beam splitter 111, first quarter waveplate 1112, filter 113, and second quarter waveplate 114 can be reversed.

Operation of Multiplexer 100

In one implementation, the multiplexer 100 multiplexes light signals having four wavelengths, $\lambda_1$, $\lambda_2$, $\lambda_3$, and $\lambda_4$. FIGS. 2A–2D illustrate the paths of light from each input laser diode 101–104 to the output port 105 of the multiplexer 100. FIG. 2A illustrates the path of a light beam 210 having a first wavelength, $\lambda_1$, through the multiplexer 100. The light beam 210 is emitted by laser diode 101 with a horizontal polarization (i.e., as an o-beam). The light beam 210 passes through the polarization beam splitter 106 to the quarter waveplate 107. The quarter waveplate 107 rotates the polarization of the light beam 210 by substantially 45 degrees from a horizontally linear polarization into a circular polarized light. The light beam 210 is then incident upon the first filter 108. The first filter 108 can be configured such that light beams having a wavelength of $\lambda_2$ are allowed to pass while reflecting light beams having a wavelength of $\lambda_1$. In one implementation, the filter can be configured to reflect light having other wavelengths in addition to $\lambda_1$. Thus, the first filter 108 reflects the light beam 210, having wavelength $\lambda_1$, back through the quarter waveplate 107. The quarter waveplate 107 again rotates the polarization of the light beam 210 by substantially another 45 degrees from the circular polarization into a vertically linear polarization (i.e., an e-beam). The polarization beam splitter 106 then reflects the vertically polarized light beam 210 to the output port 105.

FIG. 2B illustrates the path of a light beam 215 having the second wavelength, $\lambda_2$, through the multiplexer 100. The light beam 215 is emitted by the laser diode 102 with a horizontal polarization. The light beam 215 passes through the quarter waveplate 109. Quarter waveplate 109 rotates the polarization of the light beam 215 from the horizontally linear polarization into a circular polarization. The light beam 215 then passes through the first filter 108. As disclosed above, the first filter 108 is configured to allow a light beam having a wavelength of $\lambda_2$ to pass while reflecting one or more other wavelengths. After passing through the first filter 108, the light beam 215 passes through the quarter waveplate 107. Quarter waveplate 107 rotates the polarization of light beam 215 from the circular polarization into the vertically linear polarization. The vertically polarized light beam 215 is then reflected by the polarization beam splitter 106 towards the output port 105.

FIG. 2C illustrates the path of a third light beam 220, having a wavelength of $\lambda_3$, through the multiplexer 100. The light beam 220 is emitted by the laser diode 103 with a horizontal polarization. The light beam 220 passes through the polarization beam splitter 111 to the quarter waveplate 112. The quarter waveplate 112 rotates the polarization of the light beam 220 from the horizontally linear polarization into a circular polarization. The light beam 220 is then incident upon the second filter 113. The second filter 113 can be configured to allow light beams having a wavelength of $\lambda_4$ to pass through the filter while reflecting light beams having one or more other wavelengths, including $\lambda_3$. Thus, the second filter 113 reflects light beam 220 having wavelength $\lambda_3$ back through the quarter waveplate 112. Quarter waveplate 112 again rotates the polarization of the light beam 220 from the circular polarization into the vertically linear polarization. The polarization beam splitter 111 reflects the light beam 220 through the polarization rotator 110. The polarization rotator 110 then rotates the polarization of the light beam 220 by substantially 90°. Light beam 220 having the horizontal polarization then passes through the polarization beam splitter 106 to the output port 105.

FIG. 2D illustrates the path of a fourth light beam 225, having a wavelength of $\lambda_4$, through the multiplexer 100. The light beam 225 is emitted by laser diode 104 with a horizontal polarization. The light beam 225 passes through the quarter waveplate 114. Quarter waveplate 114 rotates the polarization of the light beam 225 from the horizontally linear polarization into a circular polarization. The light beam 225 then passes through the second filter 113. As described above, the second filter 113 can be configured to allow light beams having the wavelength $\lambda_4$ to pass while reflecting light beams having one or more other wavelengths. The light beam 225 then passes through the quarter waveplate 112. Quarter waveplate 112 rotates the polarization of the light beam 225 from the circular polarization into the vertically linear polarization. The light beam 225 is then reflected by the polarization beam splitter 111 toward the polarization rotator 110. The polarization rotator 110 rotates the polarization of the light beam 225 by substantially 90 degrees. Light beam 225, having horizontal polarization, can then pass through the polarization beam splitter 106 to the output port 105. The light beams 210, 215, 220, and 225 combine at the output port 105 to form a multiplexed light beam.

In one implementation, the multiplexer 100 includes spherical lenses (not shown) to collimate the light beam emitted from the laser diodes 101–104. In another implementation the output port 105 outputs the multiplexed light beam through one or more collimators.

Multiplexer 300

Figure 3:
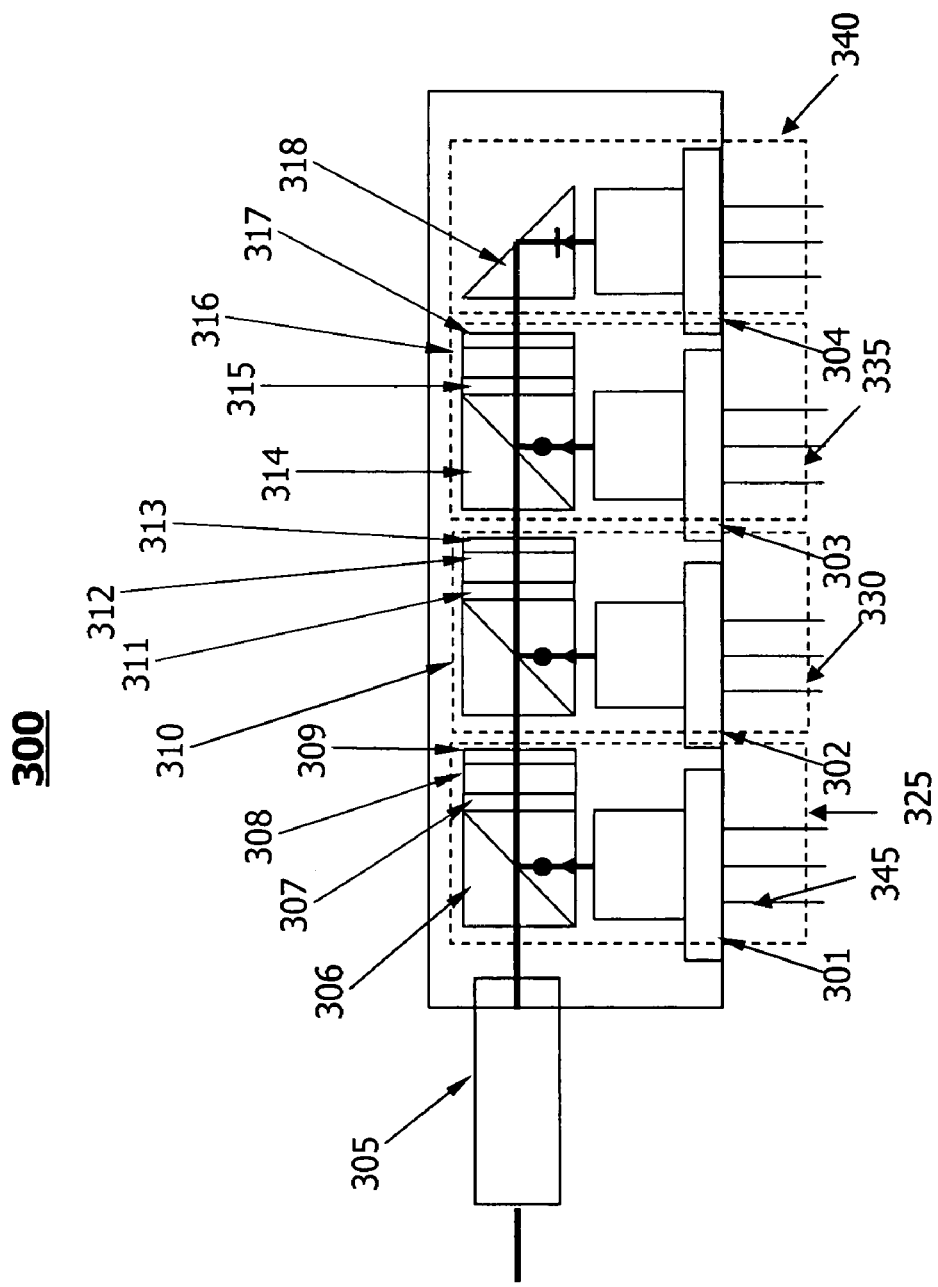
FIG. 3 illustrates an integrated optical multiplexer within a single package.

FIG. 3 illustrates another implementation of an integrated optical multiplexer within a single package. The multiplexer 300 includes laser diodes 301, 302, 303, and 304 and an output port 305 residing within a single package. In one implementation, the laser diode package can be a standard TO-18 package. In another implementation, each laser diode 301–304 includes one or more electrical pins (e.g., electrical pin 345) for receiving an electrical input signal. In one implementation, the electrical pins of each laser diode 301–304 are in the same plane.

In one implementation, the multiplexer 300 includes four input blocks 325, 330, 335, and 340. Each input block 325–340 is optically coupled to the output port 305. The first input block 325 includes a first laser diode 301, a first polarization beam splitter 306, a first quarter waveplate 307, a first filter 308, and a first three-quarter waveplate 309. The second input block 330 includes a second laser diode 302, a second polarization beam splitter 310, a second quarter waveplate 311, a second filter 312, and a second three-quarter waveplate 313. The third input block 335 includes a third laser diode 303, a third polarization beam splitter 314, a third quarter waveplate 315, a third filter 316, and a third three-quarter waveplate 317. The final input block 350 includes a fourth laser diode 304 and a reflector 318. In one implementation, the reflector 318 is a right angle prism.

The first laser diode 301 is optically coupled to the first polarization beam splitter 306. The first polarization beam splitter 306 is optically coupled to the output port 305 and the first quarter waveplate 307. The first quarter waveplate 307 is optically coupled to the first filter 308. The first filter 308 is optically coupled to the first three-quarter waveplate 309. The first three-quarter waveplate 309 is optically coupled to the second input block 330.

The second laser diode 302 is optically coupled to the second polarization beam splitter 310. The second polarization beam splitter 310 is optically coupled to the first input block 325 and the second quarter waveplate 311. The second quarter waveplate 311 is optically coupled to the second filter 312. The second filter 312 is optically coupled to the second three-quarter waveplate 313. The second three-quarter waveplate 313 is optically coupled to the third input block 335.

The third laser diode 313 is optically coupled to the third polarization beam splitter 314. The third polarization beam splitter 314 is optically coupled to the second input block 330 and the third quarter waveplate 315. The third quarter waveplate 315 is optically coupled to the third filter 316. The third filter 316 is optically coupled to the third three-quarter waveplate 317. The third three-quarter waveplate 317 is optically coupled to the final input block 340. The fourth laser diode 304 is optically coupled to the reflector 318. The reflector 318 is optically coupled to the third input block 335.

Operation of Multiplexer 300

Figure 4A:
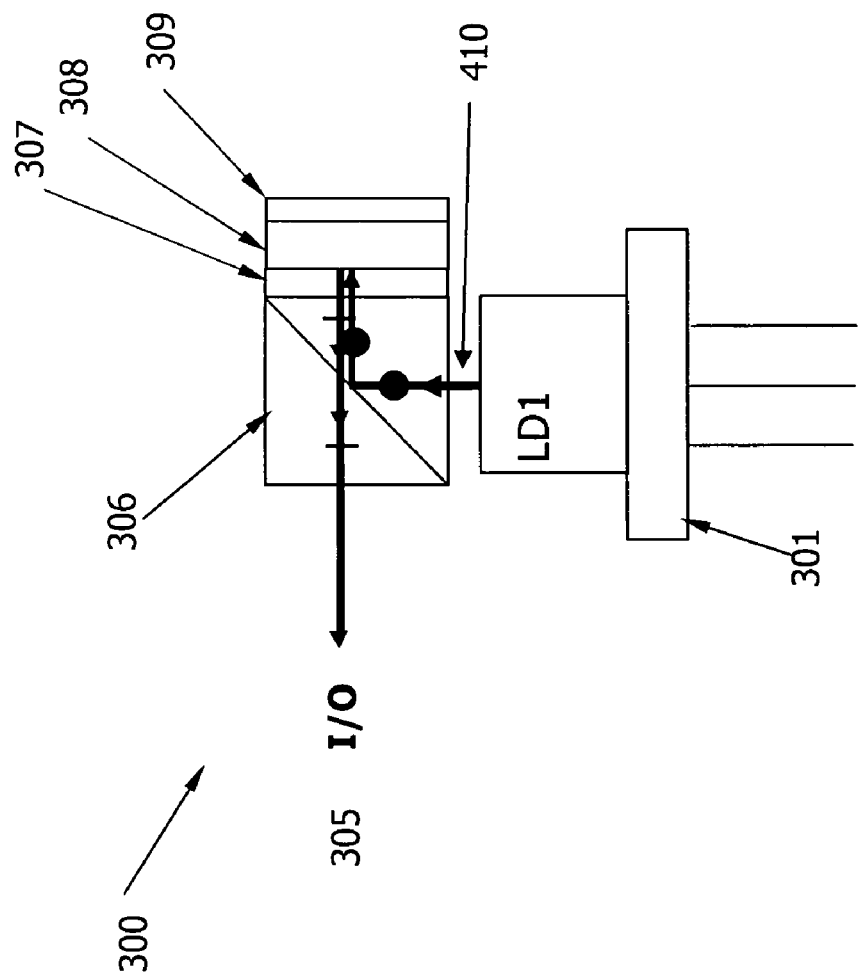
FIGS. 4A–4D illustrate the paths of light beams through the integrated optical multiplexer of FIG. 3.

FIGS. 4A–4D illustrate the paths of light through the integrated optical multiplexer 300. In one implementation, the multiplexer 300 multiplexes four light beams having wavelengths, $\lambda_1$, $\lambda_2$, $\lambda_3$, and $\lambda_4$. FIG. 4A illustrates the path of a light beam 410, having a wavelength of $\lambda_1$, through the multiplexer 300. The light beam 410 is emitted by laser diode 301 with a vertical polarization (i.e., as an e-beam). The light beam 410 is reflected by the polarization beam splitter 306 to the quarter waveplate 307. Quarter waveplate 307 rotates the polarization of light beam 410 from the vertically linear polarization into a circular polarization. The light beam 410 is then incident upon the first filter 308. The first filter 308 can be configured to reflect light beams having a wavelength of $\lambda_1$ while allowing other wavelengths (e.g., all other wavelengths or selected wavelengths) to pass through. Thus, the first filter 308 reflects the light beam 410 back through the quarter waveplate 307. Quarter waveplate 307 rotates the polarization of the light beam 410 from the circular polarization into a horizontally linear polarization (i.e., an o-beam). The horizontally polarized light beam 410 can then pass through the polarization beam splitter 306 toward the output port 305.

Figure 4B:
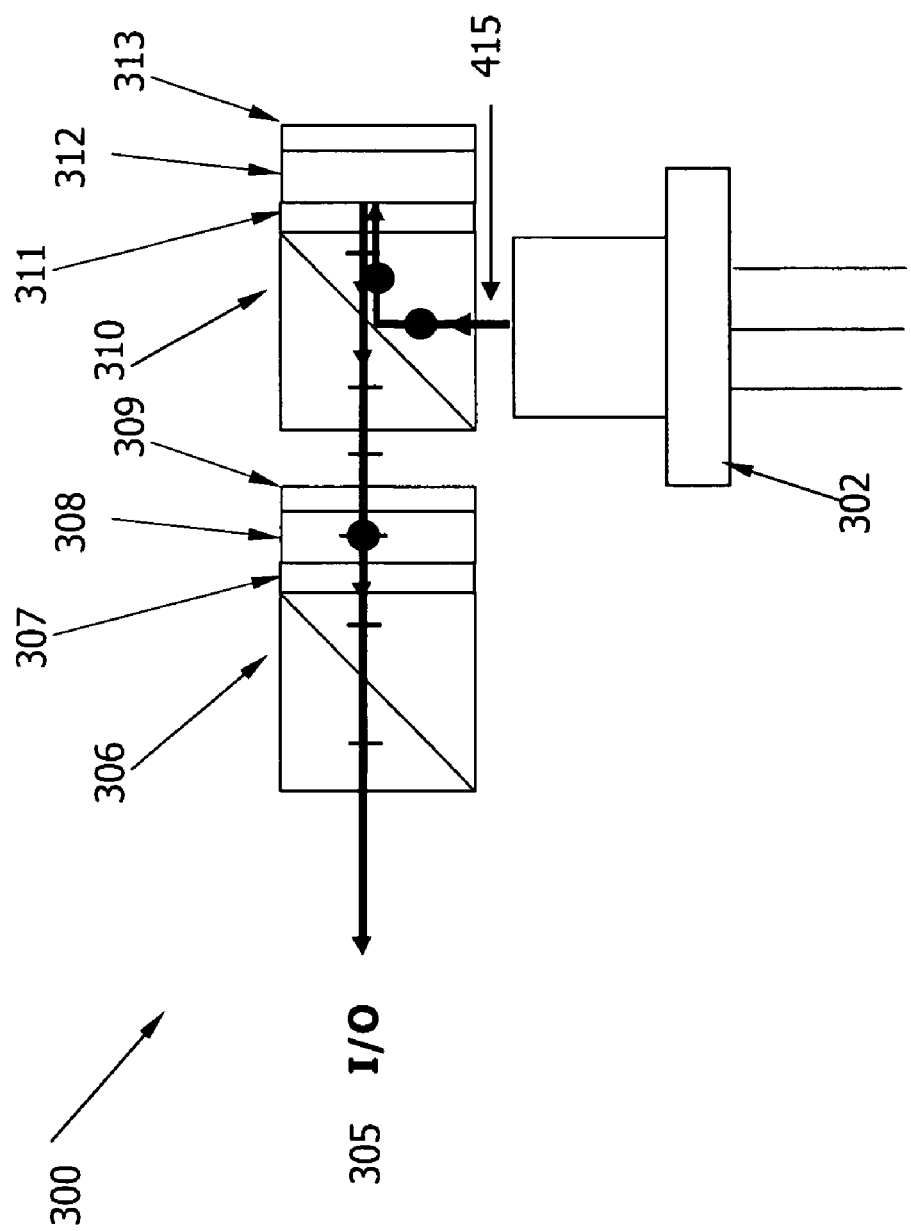

FIG. 4B illustrates the path of a second light beam 415, having a wavelength $\lambda_2$, through the multiplexer 300. The light beam 415 is emitted by laser diode 302 with a vertical polarization. The light beam 415 is reflected by the polarization beam splitter 310 to the quarter waveplate 311. The quarter waveplate 311 rotates the polarization of the light beam 415 from the vertically linear polarization into a circular polarization (e.g., rotating the polarization by substantially 45 degrees). The light beam 415 then is incident upon the second filter 312. The second filter 312 can be configured to reflect light beams having a wavelength of $\lambda_2$ while allowing light beams having other wavelengths (e.g., all other wavelengths or selected wavelengths) to pass through. Thus, the second filter 312 reflects the light beam 415, having a wavelength of $\lambda_2$, back through the quarter waveplate 311. The quarter waveplate 311 again rotates the polarization of the light beam 415 by substantially 45 degrees from the circular polarization into a horizontally linear polarization. The light beam 415 passes through the polarization beam splitter 310 to the three-quarter waveplate 309. The three-quarter waveplate 309 rotates the polarization of the light beam 415 by substantially 135 degrees from the horizontally linear polarization into a circular polarization. The light beam 415 then passes through the first filter 308 and to the quarter waveplate 307. As discussed above, the first filter 308 allows wavelengths other than $\lambda_1$ to pass. The quarter waveplate 307 rotates the polarization of the light beam 415 substantially an additional 45 degrees from the circular polarization into a horizontally linear polarization. The light beam 415, having a horizontal polarization, can then pass through the polarization beam splitter 306 to the output port 305.

Figure 4C:
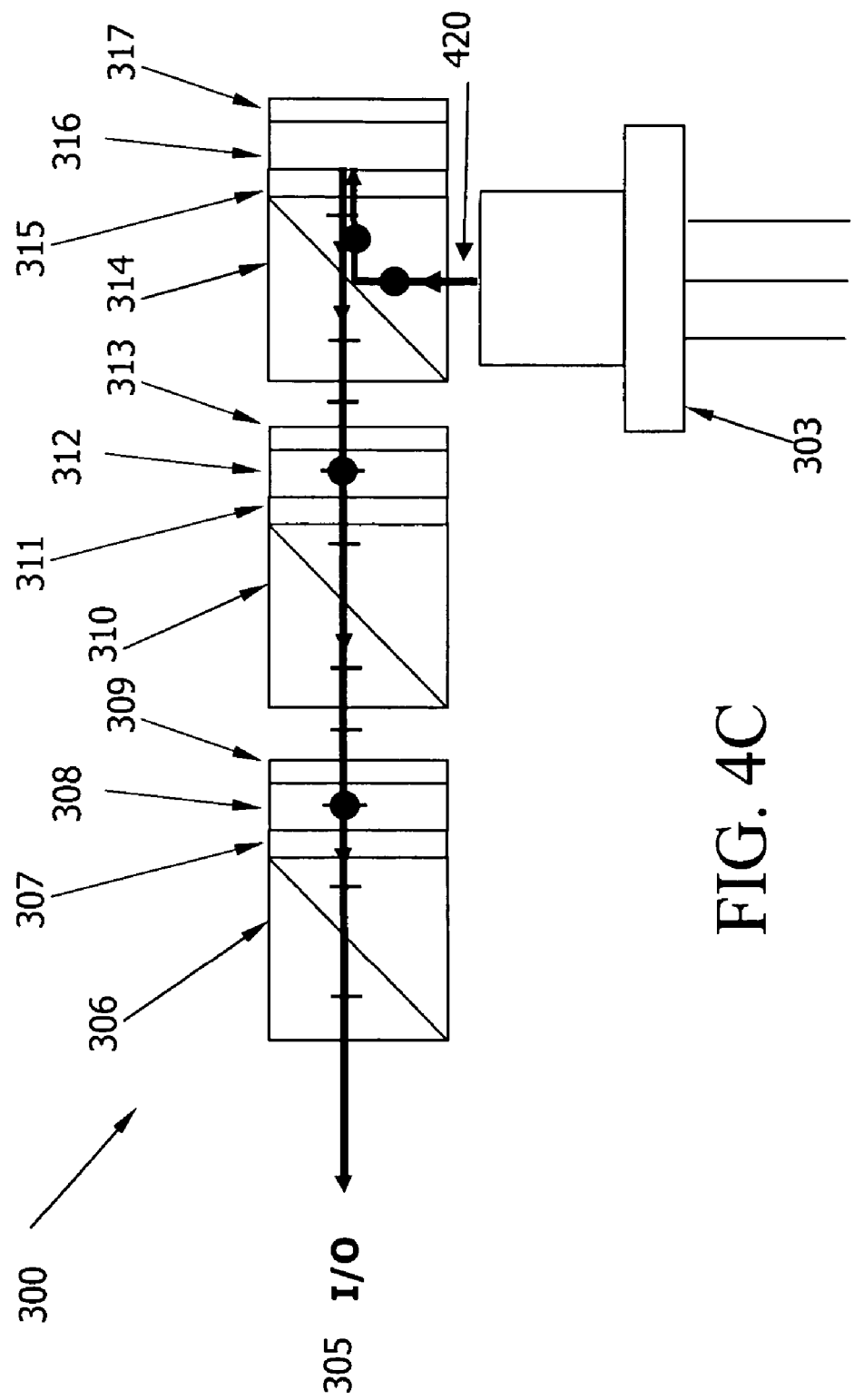

FIG. 4C illustrates the path of a third light beam 420, having a wavelength of $\lambda_3$, through the multiplexer 300. The light beam 420 is emitted by laser diode 303 with a vertical polarization. The light beam 420 is then reflected by polarization beam splitter 314 to the quarter waveplate 315. The quarter waveplate 315 rotates the polarization of the light beam 420 by substantially 45 degrees from the vertically linear polarization into a circular polarization. The light beam 420 is then incident upon the third filter 316. The third filter 316 can be configured to reflect light beams having a wavelength of $\lambda_3$ while allowing light beams having one or more other wavelengths to pass through the filter. Thus, the third filter 316 reflects the light beam 420 having a wavelength of $\lambda_3$ back through the quarter waveplate 315. The quarter waveplate 315 again rotates the polarization of the light beam 420 from the circular polarization into a horizontally linear polarization. The light beam 420 can then pass through the polarization beam splitter 314 to the three-quarter waveplate 313. The three-quarter waveplate 313 rotates the polarization of the light beam 420 by substantially 135 degrees from the horizontally linear polarization into a circular polarization. The light beam 420 then passes through the second filter 312 and to the quarter waveplate 311. The quarter waveplate 311 rotates the polarization of the light beam 420 by substantially an additional 45 degrees from the circular polarization into a horizontally linear polarization. The light beam 420, having a horizontal polarization, then passes through the polarization beam splitter 310 to the three-quarter waveplate 309. The three-quarter waveplate 309 rotates the polarization of the light beam 420 by substantially 135 degrees from the horizontally linear polarization into a circular polarization. The light beam 420 then passes through the first filter 308 and to the quarter waveplate 307. The quarter waveplate 307 rotates the polarization of light beam 420 from the circular polarization into the horizontally linear polarization. The light beam 420, having a horizontal polarization, can then pass through the polarization beam splitter 306 to the output port 305.

Figure 4D:
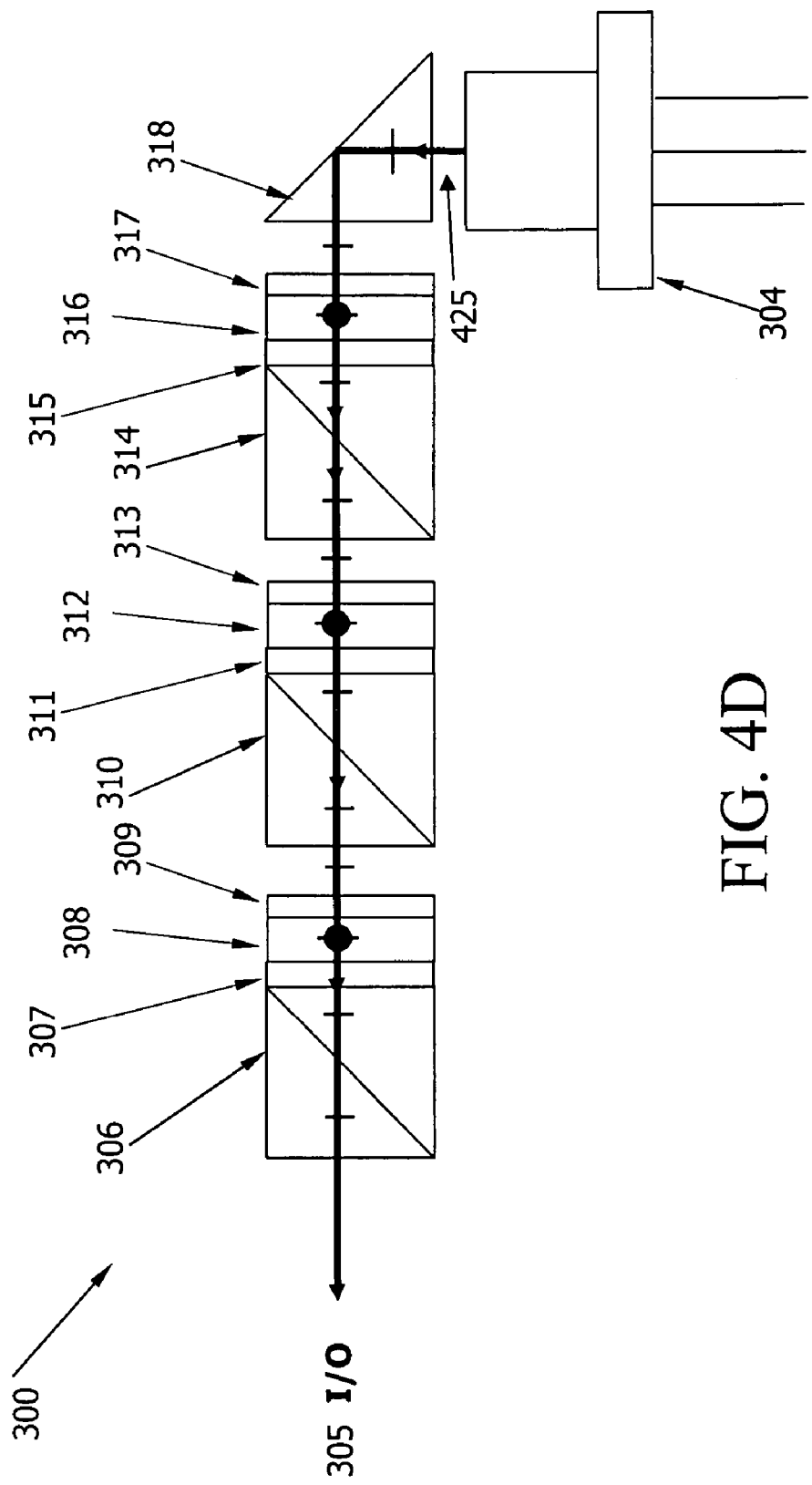

FIG. 4D illustrates the path of a fourth light beam 425, having a wavelength $\lambda_4$, through the multiplexer 300. The light beam 425 is emitted by laser diode 304 with a horizontal polarization toward the reflector 318. The light beam 425 is reflected by the reflector 318 toward the three-quarter waveplate 317. In one implementation, the reflector reflects light beams at substantially a 90 degree angle. In an alternative implementation, the reflector 318 can be eliminated and the laser diode 304 optically aligned with the three-quarter waveplate 317.

The three-quarter waveplate 317 rotates the polarization of the light beam 425 by substantially 135 degrees from the horizontally linear polarization into a circular polarization. The light beam 425 then passes through the third filter 316 to the quarter waveplate 315. The quarter waveplate 315 rotates the polarization of the light beam 425 by substantially an additional 45 degrees from the circular polarization into a horizontally linear polarization. The light beam 425 passes through the polarization beam splitter 314 to the three-quarter waveplate 313. The three-quarter waveplate 313 rotates the polarization of the light beam 425 from the horizontally linear polarization into a circular polarization. The light beam 425 then passes through the second filter 312 and to the quarter waveplate 311. The quarter waveplate 311 rotates the polarization of the light beam 425 by an additional 45 degrees from the circular polarization into the horizontally linear polarization. The light beam 425 has a horizontal polarization and passes through the polarization beam splitter 310 to the three-quarter waveplate 309. The three-quarter waveplate 309 rotates the polarization of the light beam 425 from the horizontally linear polarization into the circular polarization. The light beam 425 then passes through the first filter 308 and to the quarter waveplate 307. The quarter waveplate 307 rotates the polarization of the light beam 425 from the circular polarization into the horizontally linear polarization. The light beam 425, having the horizontal polarization, passes through the polarization beam splitter 306 to the output port 305.

Although the multiplexer 100 and 300 are each illustrated as a four-channel multiplexer, in alternative implementations any number of channels can be multiplexed. For example, additional sets of the input blocks (e.g., input block 325) can be cascaded between the output port (e.g. output port 305) and a final input block having a reflector (e.g., final block 340) to accommodate the multiplexing of additional channels. Similarly, in multiplexer 100, sets of laser diode pairs (e.g., laser diode pair 115) can be added with a polarization rotator optically coupled between the sets. Additionally, fewer channels can be multiplexed. For example, the multiplexer can have fewer input blocks or laser diode pairs in a package. Alternatively, less than all of the laser diodes can be activated to provide a multiplexed signal having fewer channels.

Demultiplexer 500

Figure 5:
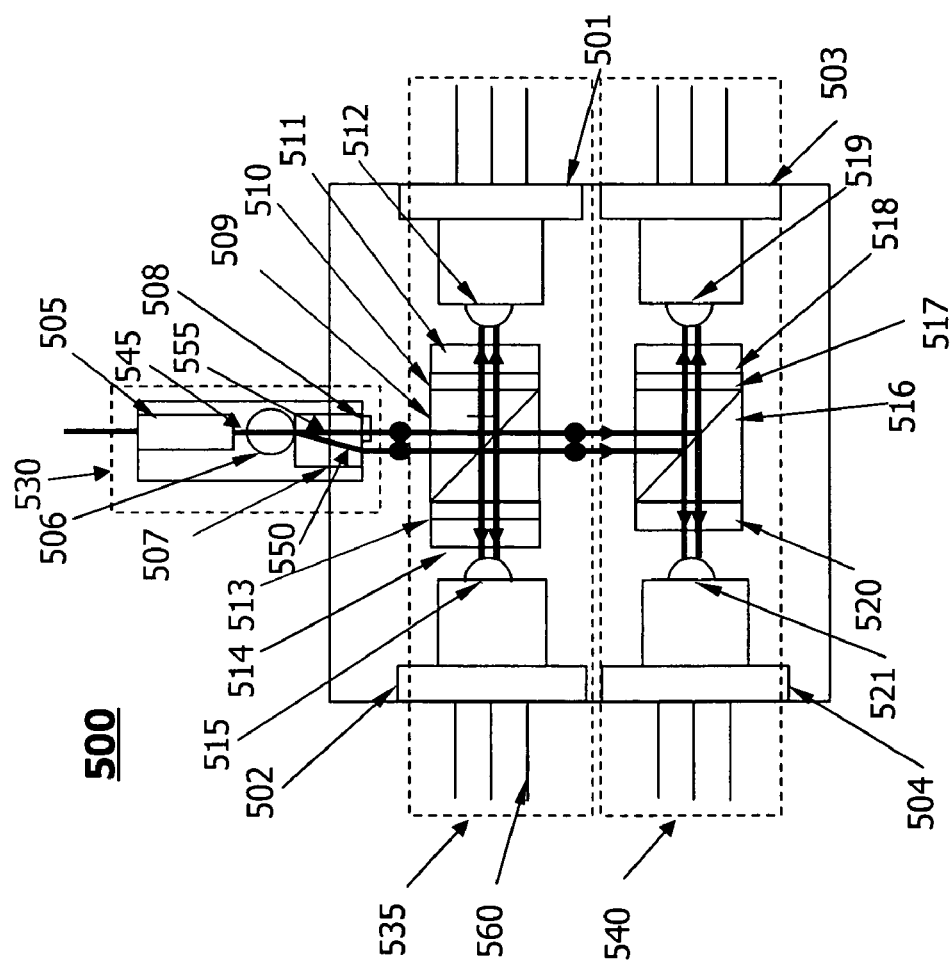
FIG. 5 illustrates an integrated optical demultiplexer within a single package.

FIG. 5 illustrates one implementation of an integrated optical demultiplexer 500. Demultiplexer 500 includes an input block 530, a first photo-detector pair 535, and a second photo-detector pair 540. In one implementation, the first and second photo-detector pairs 530 and 535 are within the same package. In one implementation, the package has dimensions of substantially 15 mm×16 mm. The input block 530 includes an input port 505, a collimating lens 506, a polarization beam displacer 507 (e.g., a birefringent crystal), and a polarization rotator 508 (e.g., a half waveplate). The first photo-detector pair 535 includes a first photo-detector 501, a first focusing lens 512, a first filter 511, a first quarter waveplate 510, a first polarization beam splitter 509, a second quarter waveplate 513, a second filter 514, a second focusing lens 515, and a second photo-detector 502. The second photo-detector pair 540 includes a third photo-detector 503, a third focusing lens 519, a third filter 518, a third quarter wave plate 517, a second polarization beam splitter 516, a fourth filter 520, a fourth focusing lens 521, and a fourth photo-detector 504. In one implementation, each photo-detector 501–504 includes one or more electrical pin outputs (e.g., electrical pin 560). In another implementation, the electrical outputs for each photo-detector can be positioned in a same plane relative to the demultiplexer package.

The input port 505 of the input block 530 is optically coupled to the collimating lens 506. The collimating lens 506 is optically coupled to the polarization beam displacer 507. The polarization rotator is optically coupled between a portion of the polarization beam displacer 507 and the first photo-detector pair 535.

The first photo-detector 512 is optically coupled to the first focusing lens 512. The first filter 511 is optically coupled between the first focusing lens 512 and the first quarter waveplate 510. The first polarization beam splitter 509 is optically coupled between the first quarter waveplate 510 and the second quarter waveplate 513. The first polarization beam splitter is also optically coupled to the input block 530 and the second photo-detector pair 540. The second filter 514 is optically coupled to the second quarter waveplate 513 and the second focusing lens 515. The second photo-detector 502 is optically coupled to the second focusing lens 515.

The third photo-detector 503 is optically coupled to the third focusing lens 519. The third filter 518 is optically coupled between the third focusing lens 519 and the third quarter waveplate 517. The second polarization beam splitter 516 is optically coupled between the third quarter waveplate 517 and the fourth filter 520. The second polarization beam splitter 516 is also coupled to the first photo-detector pair 535. The fourth focusing lens 521 is optically coupled between the fourth filter 520 and the fourth photo-detector 504.

Operation of Demultiplexer 500

In one implementation, the demultiplexer 500 demultiplexes a light beam 545 including four channels having wavelengths $\lambda_1$, $\lambda_2$, $\lambda_3$, and $\lambda_4$. The light beam 545 enters the demultiplexer 500 through the input port 505. Within the input port 505, the light beam 545 is collimated by the collimating lens 506. The polarization beam displacer 507 then separates the light beam 545 into a first light beam 550 having a vertical polarization (e.g., an e-beam) and a second light beam 555 having a horizontal polarization (e.g., an o-beam). The second light beam 555 then passes through the polarization rotator 508. The polarization rotator 508 changes the polarization of the second light beam 555 from the horizontal polarization to the vertical polarization. The first light beam 550 does not pass through the polarization rotator 508. In one implementation, the two light beams 550 and 555 exit the input block 530 substantially in parallel.

The first and second light beams 550 and 555 having the vertical polarization and including wavelengths $\lambda_1$–$\lambda_4$ enter the first photo-detector pair 535 and are then reflected by the first polarization beam splitter 509. The first and second light beams 550 and 555 then pass through the first quarter waveplate 510. The first quarter waveplate 510 rotates the polarization of the first and second light beams 550 and 555 by substantially 45 degrees from the vertically linear polarization into a circular polarization. The first and second light beams 550 and 555 are then incident upon the first filter 511.

The first filter 511 can be configured such that a light signal having a wavelength of $\lambda_1$ passes through but light signals having other wavelengths are reflected. Thus, the component of the first and second light beams 550 and 555 having a wavelength of $\lambda_1$ passes through the first filter 511 and to the first focusing lens 512. The first focusing lens 512 focuses the component of the first and second light beams 550 and 555, having a wavelength of $\lambda_1$, onto an active area of the first photo-detector 501.

The components of the first and second light beams 550 and 555, including wavelengths $\lambda_2$–$\lambda_4$, are reflected by the first filter 511 back through the first quarter waveplate 510. The first quarter waveplate 510 rotates the polarization of the first and second light beams 550 and 555 by substantially an additional 45 degrees from the circular polarization into a horizontal linear polarization. The first and second light beams 550 and 555, having the horizontal polarization pass through the first polarization beam splitter 509 to the second quarter waveplate 513. The second quarter waveplate 513 rotates the polarization of the first and second light beams 550 and 555 from the horizontal linear polarization into the circular polarization. The first and second light beams 550 and 555 are then incident upon the second filter 513. The second filter 513 can be configured such that a light signal having a wavelength of $\lambda_2$ passes through the filter while light signals having other wavelengths are reflected. Thus, the component of the first and second light beams 550 and 555 having a wavelength of $\lambda_2$ passes through the second filter 513 and to the second focusing lens 515. The second focusing lens 515 then focuses the component of the first and second light beams 550 and 555, having a wavelength of $\lambda_2$, onto an active area of the second photo-detector 502.

The components of the first and second light beams 550 and 555, including wavelengths $\lambda_3$ and $\lambda_4$, are reflected by the second filter 514 back through the second quarter waveplate 513. The second quarter waveplate 513 rotates the polarization of the first and second light beams 550 and 555 from the circular polarization into the vertically linear polarization. The first and second light beams 550 and 555, having a vertical polarization, are then reflected by the first polarization beam splitter 509 to the second polarization beam splitter 516 of the second photo-detector pair 540. The second polarization beam splitter 516 reflects the first and second light beams 550 and 555 through the third quarter waveplate 517. The third quarter waveplate rotates the polarization of the first and second light beams 550 and 555 by substantially 45 degrees from the vertically linear polarization into a circular polarization. The first and second light beams 550 and 555 are then incident upon the third filter 518. The third filter 518 can be configured such that a light signal having a wavelength of $\lambda_3$ passes through the filter while light signals having other wavelengths are reflected. Thus, the component of the first and second light beams 550 and 555 having a wavelength of $\lambda_3$ passes through the third filter 518 and to the third focusing lens 519. The third focusing lens 519 then focuses the component of the first and second light beams 550 and 555, having a wavelength of $\lambda_3$, onto an active area of the third photo-detector 503.

The components of the first and second light beams 550 and 555, having the wavelength $\lambda_4$, are reflected by the third filter 518 back through the third quarter waveplate 517. The third quarter waveplate 517 rotates the polarization of the first and second light beams 550 and 555 by substantially an additional 45 degrees from the circular polarization into the horizontally linear polarization. The first and second light beams 550 and 555, having a wavelength $\lambda_4$, then pass through the second polarization beam splitter 516 and are incident upon the fourth filter 520. The fourth filter 520 can be configured to allow light signals having a wavelength of $\lambda_4$ to pass through while reflecting light signals having other wavelengths. Thus, the first and second light beams 550 and 555, having wavelength $\lambda_4$, pass through the fourth filter 520 and to the fourth focusing lens 521. The fourth focusing lens 521 then focuses the component of the first and second light beams 550 and 555, having a wavelength $\lambda_4$ onto an active area of the fourth photo-detector 504.

The demultiplexer can use lenses (not shown) to collimate and focus the light within the input port and to one or more photo-detectors, resulting in low insertion loss. In another implementation, the photo-detectors can be attached to a printed circuit board, for example by soldering. Received light signals can be translated into electrical signals and output from the photo-detectors through the electrical pins. The output electrical signals can be transmitted to the printed circuit board or to other electronic devices.

Demultiplexer 600

Figure 6:
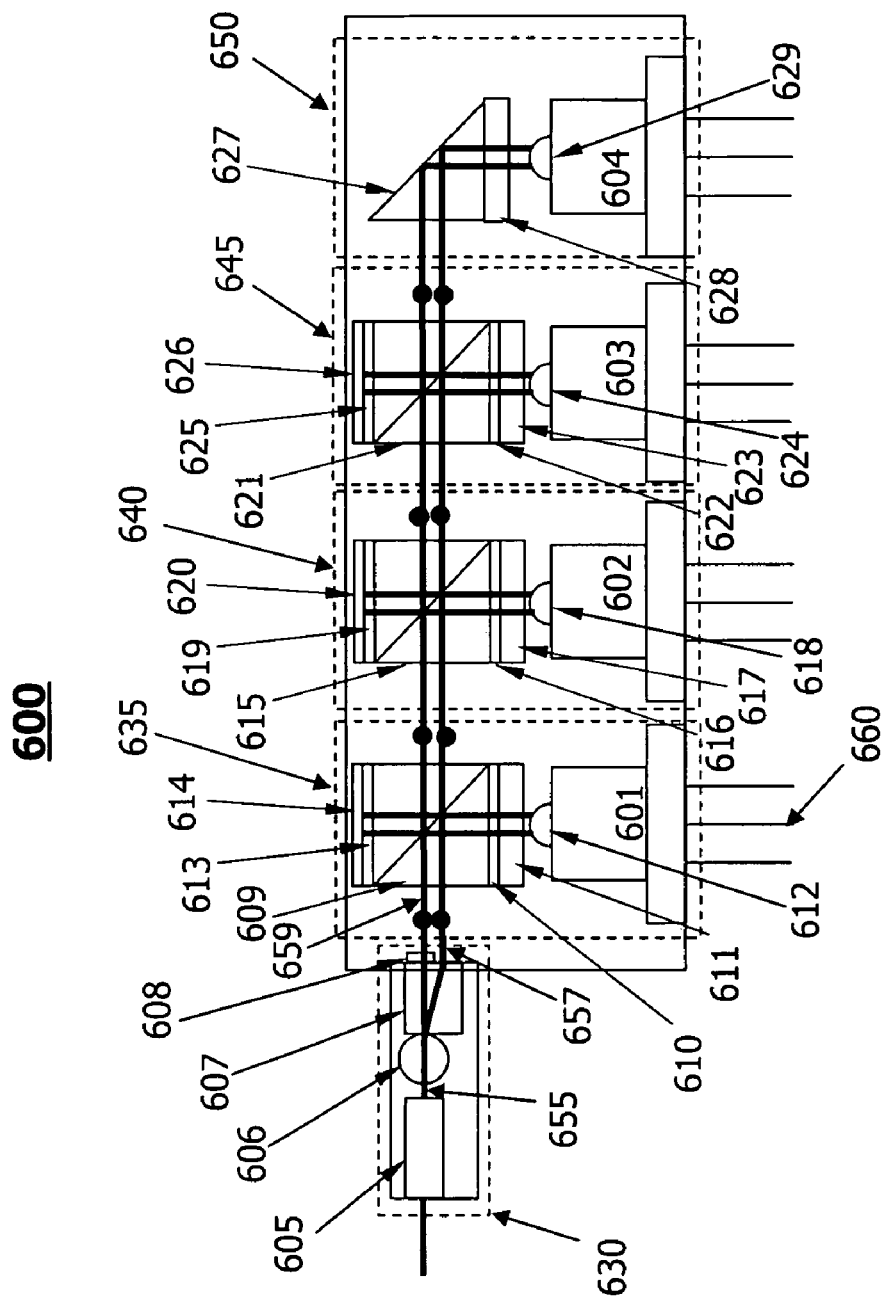
FIG. 6 illustrates an integrated optical demultiplexer within a single package.

FIG. 6 illustrates another implementation of an integrated optical demultiplexer provided. Demultiplexer 600 includes an input block 630, three photo-detector blocks 635, 640, and 645, and a final photo-detector block 650. In one implementation, the three photo-detector blocks 635, 640, and 645, and the final photo-detector block 650 are positioned within a single package. In another implementation, the dimensions of one package including the four photo-detector blocks 635–650 is substantially 27 mm×9 mm.

The input block 630 includes an input port 605, a collimating lens 606, a polarization beam displacer 607 (e.g., a birefringent crystal), and a polarization rotator 608 (e.g., a half waveplate). The first photo-detector block 635 includes a first photo-detector 601, a first focusing lens 612, a first filter 611, a first quarter waveplate 610, a first polarization beam splitter 609, a second quarter waveplate 613, and a reflector, for example, a first mirror 614.

Similarly, the second photo-detector block 640 includes second photo-detector 602, a second focusing lens 618, a second filter 617, a third quarter waveplate 616, a second polarization beam splitter 615, a fourth quarter waveplate 619, and a second mirror 620. The third photo-detector block 645 includes a third photo-detector 603, a third focusing lens 624, a third filter 623, a fifth quarter waveplate 622, a third polarization beam splitter 621, a sixth quarter waveplate 625, and a third mirror 626. The final photo-detector block 650 includes a fourth photo-detector 604, a fourth focusing lens 629, a fourth filter 628 and a reflector 627. In one implementation, the reflector can be a right-angle prism. In one implementation, each photo-detector 601–604 includes one or more electrical pin outputs (e.g., electrical pin 660). In another implementation, the electrical outputs for each photo-detector can be positioned in a same plane and on a same side of the package of demultiplexer 600.

The input port 605 of the input block 630 is optically coupled to the collimating lens 606. The collimating lens 606 is optically coupled to the polarization beam displacer 607. The polarization rotator 608 is optically coupled between a portion of the polarization beam displacer 607 and the first photo-detector pair 635.

The first photo-detector 601 is optically coupled to the first focusing lens 612. The first filter 611 is optically coupled between the first focusing lens 612 and the first quarter waveplate 610. The first polarization beam splitter 609 is optically coupled between the first quarter waveplate 610 and the second quarter waveplate 613. The first polarization beam splitter 609 is also optically coupled to the input block 630 and the second photo-detector block 640. The first mirror 614 is optically coupled to the second quarter waveplate 613.

The components of the second and third photo-detector blocks 640 and 645 are positioned similarly to the first photo-detector block 635. The second photo-detector 602 is optically coupled to the second focusing lens 618. The second filter 617 is optically coupled between the second focusing lens 618 and the third quarter waveplate 616. The second polarization beam splitter 615 is optically coupled between the third quarter waveplate 616 and the fourth quarter waveplate 619. The second polarization beam splitter 615 is also optically coupled to the first photo-detector block 635 and the third photo-detector block 645. The second mirror 620 is optically coupled to the fourth quarter waveplate 619.

The third photo-detector 603 is optically coupled to the third focusing lens 624. The third filter 623 is optically coupled between the third focusing lens 624 and the fifth quarter waveplate 622. The third polarization beam splitter 621 is optically coupled between the fifth quarter waveplate 622 and the sixth quarter waveplate 625. The third polarization beam splitter 621 is also optically coupled to the second photo-detector block 640 and the final photo-detector block 650. The third mirror 626 is optically coupled to the sixth quarter waveplate 625.

The fourth photo-detector 604 is optically coupled to the fourth focusing lens 629. The fourth filter 628 is optically coupled between the fourth focusing lens 629 and the reflector 627. The reflector 627 is also optically coupled to the third photo-detector block 645.

Operation of Demultiplexer 600

In one implementation, the demultiplexer 600 demultiplexes a light beam 655 that includes four channels having wavelengths $\lambda_1$, $\lambda_2$, $\lambda_3$, and $\lambda_4$. The light beam 655 enters the demultiplexer 600 through the input port 605 of input block 630. Within the input port 605, the light beam 655 is collimated by the collimating lens 606. The polarization beam displacer 607 then separates the light beam 655 into a first light beam 657 having a vertical polarization (e.g., an e-beam) and a second light beam 659 having a horizontal polarization (e.g., an o-beam). The second light beam 659 passes through the polarization rotator 608. The polarization rotator 608 changes the polarization of the second light beam 659 from the horizontal polarization into the vertical polarization.

The first and second light beams 657 and 659, having the vertical polarization, including wavelengths $\lambda_1$–$\lambda_4$ enter the first photo-detector block 635 and are reflected by the first polarization beam splitter 609. The first and second light beams 657 and 659 then pass through the first quarter waveplate 610. The first quarter waveplate 610 rotates the polarization of the first and second light beams 657 and 659 by substantially 45 degrees from the vertical linear polarization into a circular polarization. The first and second light beams 657 and 659 are then incident upon the first filter 611. The first filter 611 can be configured such that a light signal having a wavelength of $\lambda_1$ passes through the filter but light signals having other wavelengths are reflected. Thus, the components of the first and second light beams 657 and 659 having a wavelength of $\lambda_1$ pass through the first filter 611 to the first focusing lens 612. The first focusing lens 612 focuses the components of the first and second light beams 657 and 659, having a wavelength of $\lambda_1$, onto an active area of the first photo-detector 601.

The components of the first and second light beams 657 and 659, having wavelengths $\lambda_2$–$\lambda_4$, are reflected, by the first filter 611, back through the first quarter waveplate 610. The first quarter waveplate 610 rotates the polarization of the first and second light beams 657 and 659 by substantially an additional 45 degrees from the circular polarization into the horizontally linear polarization. Because of the horizontal polarization, the first and second light beams 657 and 659, having wavelengths $\lambda_2$–$\lambda_4$, pass through the first polarization beam splitter 609 to the second quarter waveplate 613. The second quarter waveplate 613 rotates the polarization of the first and second light beams 657 and 659 from the horizontally linear polarization into the circular polarization. The first and second light beams 657 and 659 are then reflected by the first mirror 614, and pass back through the second quarter waveplate 613, which again rotates the polarization from the circular polarization into the vertically linear polarization. The first and second light beams 657 and 659, having the vertical polarization, are then reflected by the first polarization beam splitter 609 to the second polarization beam splitter 615.

The second polarization beam splitter 615 reflects the first and second light beams 657 and 659 to the third quarter waveplate 616. The third quarter waveplate 616 rotates the polarization of the first and second light beams 657 and 659 from the vertical linear polarization into the circular polarization. The first and second light beams 657 and 659 are then incident upon the second filter 617. The second filter 617 can be configured such that a light signal having a wavelength of $\lambda_2$ passes through the filter while light signals having other wavelengths are reflected. Thus, the components of the first and second light beams 657 and 659 having a wavelength of $\lambda_2$ pass through the second filter 617 and to the second focusing lens 618. The second focusing lens 618 focuses the components of the first and second light beams 657 and 659 having a wavelength of $\lambda_2$ onto an active area of the second photo-detector 602.

The components of the first and second light beams 657 and 659, having wavelengths $\lambda_3$ and $\lambda_4$, are reflected by the second filter 617 back through the third quarter waveplate 616. The third quarter waveplate 616 rotates the polarization of the first and second light beams 657 and 659 from a circular polarization into the horizontally linear polarization. The first and second light beams 657 and 659, having the horizontal polarization, then pass through second polarization beam splitter 615 to the fourth quarter waveplate 619. The fourth quarter waveplate 619 rotates the polarization of first and second light beams 657 and 659 from the horizontally linear polarization into a circular polarization. The first and second light beams 657 and 659 are then reflected by the second mirror 620 back through the fourth quarter waveplate 619, which again rotates the polarization from a circular polarization into the vertically linear polarization. The first and second light beams 657 and 659, having the vertical polarization, are then reflected by the second polarization beam splitter 615 to the third polarization beam splitter 621.

The third polarization beam splitter 621 reflects the first and second light beams 657 and 659 through the fifth quarter waveplate 622. The fifth quarter waveplate 622 rotates the polarization of the first and second light beams 657 and 659 from the vertically linear polarization into a circular polarization. The first and second light beams 657 and 659 are then incident upon the third filter 623. The third filter 623 can be configured such that a light signal having a wavelength of $\lambda_3$ passes through the filter while light signals having other wavelengths are reflected. Thus, the components of the first and second light beams 657 and 659 having a wavelength of $\lambda_3$ pass through the third filter 623 and to the third focusing lens 624. The third focusing lens 624 focuses the components of the first and second light beams 657 and 659, having a wavelength of $\lambda_3$ onto an active area of the third photo-detector 603.

The component of the first and second light beams 657 and 659, having a wavelength of $\lambda_4$, is reflected by the third filter 623 back through the fifth quarter waveplate 622. The fifth quarter waveplate 622 rotates the polarization of the first and second light beams 657 and 659 from a circular polarization into the horizontally linear polarization. The first and second light beams 657 and 659, having the horizontal polarization pass through third polarization beam splitter 621 to the sixth quarter waveplate 625. The sixth quarter waveplate 625 rotates the polarization of the first and second light beams 657 and 659 from the horizontally linear polarization into a circular polarization.

The first and second light beams 557 and 559 are then reflected by the third mirror 626 back through the sixth quarter waveplate 625, which again rotates the polarization from a circular polarization into the vertically linear polarization. The first and second light beams 557 and 559, having the vertical polarization, are then reflected by the third polarization beam splitter 621 to the reflector 627. In one implementation, the reflector can be a right angle prism that reflects incident light at substantially a 90 degree angle. The reflector 627 reflects first and second light beams 557 and 559 toward the fourth filter 628. In an alternative implementation, the reflector can be eliminated and the laser diode 304 optically aligned with the fourth filter 628.

The fourth filter 628 can be configured to allow a light signal having a wavelength of $\lambda_4$ to pass through the filter while reflecting light signals having other wavelengths. Thus, the component of first and second light beams 557 and 559 having a wavelength of $\lambda_4$ passes through the fourth filter 628 to the fourth focusing lens 629. The fourth focusing lens 629 then focuses the first and second light beams 557 and 559 having a wavelength of $\lambda_4$ onto an active area of the fourth photo-detector 604.

Although the demultiplexers 500 and 600 are each illustrated as a four-channel demultiplexer, in alternative implementations any number of channels can be demultiplexed. For example, additional sets of the basic component groups (e.g., photo-detector pairs or photo-detector blocks) can be added to accommodate the multiplexing of additional channels. Additionally, fewer channels can be multiplexed using the same structure by providing fewer basic component groups in the demultiplexer package or by providing a light signal input including fewer wavelength channels.

An integrated optical multiplexer or demultiplexer within a single package has been disclosed. The multiplexer integrates the laser diodes and the other optical components of the multiplexer within a single package. The demultiplexer integrates the photo-detectors and the other optical components of the demultiplexer within a single package. Although the present invention has been described in accordance with the embodiments shown, one of ordinary skill in the art will readily recognize that there could be variations to the embodiments and those variations would be within the spirit and scope of the following claims. Accordingly, many modifications may be made by one of ordinary skill in the art without departing from the spirit and scope of the appended claims.

What is claimed is:

1. An apparatus, comprising:
    a first laser diode pair;
    a second laser diode pair;
    a polarization rotator coupled between the first and the second laser diode pairs; and
    an output port coupled to the first laser diode pair;
    where the first and second laser diode pairs include:
        a first laser diode;
        a polarization beam splitter;
        a first quarter waveplate;
        a second quarter waveplate;
        a filter coupled between the first quarter waveplate and the second quarter waveplate and
        a second laser diode, where the polarization beam splitter, the first quarter waveplate, the second quarter waveplate, and the filter are positioned between the first laser diode and the second laser diode, and
    where the first and second laser diode pairs are coupled to the polarization rotator at the polarization beam splitter of each laser diode pair.

2. The apparatus of claim 1, where the apparatus is operable to multiplex distinct light signals emitted from the first and second laser diodes.

3. The apparatus of claim 1, the first and second laser diode pairs further comprising:
    a lens coupled to each laser diode operable to collimate light.

4. The apparatus of claim 1, the first and second laser diodes further comprising:
    one or more electrical pins for receiving input signals.

5. The apparatus of claim 1, where the apparatus is contained within a single package.

* * * * *